United States Patent
Greenblatt

(10) Patent No.: US 8,764,403 B2
(45) Date of Patent: Jul. 1, 2014

(54) FAN AND PROPELLER PERFORMANCE ENHANCEMENTS USING OUTSIZED GURNEY FLAPS

(75) Inventor: David Greenblatt, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 855 days.

(21) Appl. No.: 12/811,615

(22) PCT Filed: Jan. 1, 2009

(86) PCT No.: PCT/IL2009/000005
§ 371 (c)(1),
(2), (4) Date: Feb. 7, 2011

(87) PCT Pub. No.: WO2009/083987
PCT Pub. Date: Jul. 9, 2009

(65) Prior Publication Data
US 2011/0123348 A1    May 26, 2011

Related U.S. Application Data

(60) Provisional application No. 61/018,506, filed on Jan. 2, 2008.

(51) Int. Cl.
*F04D 29/38* (2006.01)

(52) U.S. Cl.
USPC ............. 416/228; 416/223 A; 416/235

(58) Field of Classification Search
USPC ......... 416/238, 235, 236 R, 237, 228, 223 A; 415/914
See application file for complete search history.

(56) References Cited

U.S. PATENT DOCUMENTS

| | | | | |
|---|---|---|---|---|
| 1,473,066 A * | 11/1923 | Wells | ............. | 416/235 |
| 2,385,070 A * | 9/1945 | Gant | ............. | 416/237 |
| 2,396,811 A * | 3/1946 | Bathras | ............. | 416/235 |
| 4,618,313 A * | 10/1986 | Mosiewicz | ............. | 416/237 |
| 5,492,448 A | 2/1996 | Perry et al. | | |
| 6,699,016 B1 * | 3/2004 | Dean | ............. | 416/235 |
| 7,028,954 B2 * | 4/2006 | Van Dam et al. | ............. | 244/204 |
| 2010/0104448 A1 * | 4/2010 | Moore | ............. | 416/235 |

FOREIGN PATENT DOCUMENTS

| | | |
|---|---|---|
| FR | 1412510 | 10/1965 |
| NL | 1019437 | 5/2003 |

OTHER PUBLICATIONS

International Search Report of PCT/IL2008/001407 dated mailed Feb. 9, 2009.

* cited by examiner

*Primary Examiner* — Edward Look
*Assistant Examiner* — William Grigos
(74) *Attorney, Agent, or Firm* — Browdy and Neimark, PLLC

(57) ABSTRACT

The present invention relates to enhancing performance of fans and propellers using outsized Gurney flaps. Specifically, the current invention proposes the application of 'outsized Gurney flaps' (OGFs) to the trailing-edges of fan blades. According to an exemplary embodiment of the current invention, the Gurney flaps are larger than 10% of the fan blade chord length. Attaching OGFs is not only non-obvious; it seems counterintuitive, because it is akin to placing a large bluff body onto a flow. Preliminary experimental data acquired at Reynolds numbers typically exist during fan operation on idealized blade profiles showed a 100% increase in the generated lift and 40% to 60% increase in aerodynamic efficiency. This translates to significant improvements in fan performance at a given rpm, and/or significant saving in power and noise reduction for the same aerodynamic performance. The current invention may increase performance, may decrease energy consumption, may decrease size, may decrease cost, and may increase performance of: computer cooling fans, personal upright and ceiling fans, refrigeration fans, air conditioning fans, automotive fans, ventilation, vacuuming, small-scale propellers, etc.

4 Claims, 5 Drawing Sheets

(a)

(b)

(c)

FAN AND PROPELLER PERFORMANCE ENHANCEMENTS USING OUTSIZED GURNEY FLAPS

The present invention claims priority from U.S. provisional patent application Ser. No. 61/018,506 filed by David Greenblatt on the 2 Jan. 2008.

FIELD OF THE INVENTION

The present invention relates to enhancing performance of fans and propellers using outsized Gurney flaps.

BACKGROUND OF THE INVENTION

Gurney flaps were originally used on racecars by Dan Gurney and have also been proposed for aircraft wings. They are mounted at the trailing-edge, normal to the chord and are typically around 1% of the relevant chord length (Liebeck, R. H., "Design of Subsonic Airfoils for High Lift," AIAA Journal of Aircraft, Vol. 15, No. 9, 1978, pp. 547-561.). They increase maximum lift and in some instances, if they are short enough (<1% of chord), they can slightly increase aerodynamic efficiency.

Fans and propellers are widely used in many industrial applications. Fans are used for personal, industrial and automotive cooling, ventilation, in air-conditioning units, vacuuming and dust removal, inflating, etc. Propellers are most common on personal and commercial aircraft, while propellers and ducted, or shrouded, fans are also the propulsors for airboats, air-cushion vehicles, airships and model aircraft. Shrouded propellers and fans are also touted as the primarily propulsive system for so-called personal air vehicles, a number of which are under intense development. In recent years, propellers and ducted fans have received renewed attention, particularly for the propulsion of small-scale (typically ~500 mm) unmanned air vehicles.

There is at present a strong trend toward the design of even smaller air vehicles, known as "Micro Air Vehicles" (MAVs) having maximum dimension typically between 7.5 cm and 15 cm), for a variety of military and civil applications. One consequence of these smaller scales and relatively low tip speeds is a reduced propeller fan blade Reynolds number, typically less than 100,000. At these Reynolds numbers, boundary layer transition does not occur and the boundary layer is susceptible to separation, which can result in a catastrophic loss of propulsion. The best performing blade profiles are thin, curved sections which do not produce large dynamic performance across the disk since leading-edge separation occurs at relatively low inflow angles.

Reynolds number is defined as: (air density)*(air speed relative to blade)*(chord length)/air dynamic viscosity. Thus, for a fan, as the distance from the hub increases, the Reynolds number increases proportionately because the "air speed relative to blades" increases with linearly radial distance from the hub.

Another application of fans and ducted fans at these length and velocity scales, is their ubiquitous use for the cooling of modern high-speed computer chips, motherboards and power supplies. The efficacy of these fans is often quantified as the ratio of Cubic Feet per Minute (CFM) to power input in Watts. Typically, a fan blows air across a heat-sink that is attached to a particular component, such as a CPU. In modern designs, fan speed can be controlled based on temperature feedback, and this is generally referred to as active cooling. However, modern high-speed processors require continuously greater cooling and this is generally accomplished using larger heat sinks and more powerful fans running at higher rounds per minute (rpm).

Apart from physical size limitations, these fans are increasingly noisy and require greater input power. In fact, the noise generated by fans that are used to cool high-end processors, particularly within a small physical computer sizes, is often objectionable to the user. In mobile and laptop computer, fan power requirement add to battery drain and reduces worktime between batteries charging.

The vast majority of commercial and industrial fans (computer cooling fans, personal upright and ceiling fans, refrigeration fans, air conditioning fans, automotive fans, ventilation, vacuuming etc.) are of relatively small dimension (from a few centimeters to about one meter) and they rotate at relatively low speeds (from several hundred to several thousand rpm). The blade chord lengths are also relatively small, typically from several millimeters to several centimeters). This all conspires to produce very low Reynolds numbers on the fan blades, from about 1000 to 100,000, where conventional aerodynamic shapes perform very poorly. (Small-scale propellers, such as those used for unmanned air vehicles, also suffer from similar problems.) The only airfoils that perform well at these Reynolds numbers are flat plates and curved plates and this has remained so for many decades with only minor variations on the theme.

Therefore, there is clearly a need for, and it would be highly advantageous to have, a fan; ducted fan or propeller having enhanced performance. Preferably, the performance enhancement would be achieved with a minimum or no increase of energy input.

U.S. Pat. No. 5,088,665; to Vijgen, Paul, et. al.; titled "Serrated trailing edges for improving lift and drag characteristics of lifting surfaces"; discloses a serrated trailing edge to enhance lift and drag of wing surface which has saw-tooth serrations with 60 deg. included angle between adjacent teeth.

U.S. Pat. No. 5,294,080; to Ross, James; titled "Lift enhancing tabs for airfoils"; discloses a device for enhancing lift of aircraft wing which includes tab deployable from trailing edge of fixed main element with members for actuating the tab to move from non-deployed position to deployed position.

U.S. Pat. No. 5,492,448; to Perry Frederick and Brocklehurst Alan; titled "Rotary blades" discloses rotary blades for generating lift and/or propulsion which comprises fixed boundary layer control device extending spanwise on lower surface adjacent trailing edge.

U.S. Pat. No. 6,015,115; to Dorsett, Kenneth Merlean and Stewart, Christopher Sean; titled "Inflatable structures to control aircraft" discloses an inflatable structure to control aircraft and a method of modifying the shape of an aircraft airfoil before and during flight, which includes inflating or deflating at least one inflatable bladder positioned on an aircraft wing. The inflatable structures to control aircraft include an aircraft wing structure, at least one inflatable section positioned on an aircraft wing structure in at least one location selected from the group of an upper surface, a lower surface, a leading edge and a trailing edge of the aircraft wing structure.

U.S. Pat. No. 6,863,245; to Gessler, Andreas, et. al.; titled "Aerodynamic profile with an adjustable flap"; discloses an arodynamic profile, with a trailing swing landing flap, has the flap at the under side of the lower skin and flush with it, pivoting on an integrated and airtight joint.

U.S. Pat. No. 7,028,954; to Van Dam, Cornelis P, et. al.; titled "Microfabricated translational stages for control of aerodynamic loading"; discloses a micro-fabricated translational stages for control of aerodynamic load on aircraft wing using micro-tabs mounted near or at trailing edge of wing to control lift.

U.S. Pat. No. 7,059,833; to Bonus Energy; titled "Method for improvement of the efficiency of a wind turbine rotor"; discloses a wind turbine rotor blade with a flexible serrated trailing edge.

SUMMARY OF THE INVENTION

The present invention relates to enhancing performance of fans and propellers using outsized Gurney flaps.

Specifically, the current invention proposes the application of "outsized Gurney flaps" (OGFs) to the trailing-edges of fan blades. According to an exemplary embodiment of the current invention, the Gurney flaps are larger than 10% of the fan blade chord length. Attaching OGFs is not only non-obvious; it seems counterintuitive, because it is akin to placing a large bluff body onto a flow. At conventional flight Reynolds numbers, this will cause excessive drag and buffeting. However, preliminary experimental data acquired at Reynolds numbers typically exist during fan operation on idealized blade profiles showed a 100% increase in the generated lift and 40% to 60% increase in aerodynamic efficiency. This translates to significant improvements in fan performance at a given rpm, and/or significant saving in power and noise reduction for the same aerodynamic performance. OGFs with three-dimensional notches further improve performance.

The current invention may increase performance, may decrease energy consumption, may decrease size, may decrease cost, and may increase performance of: computer cooling fans, personal upright and ceiling fans, refrigeration fans, air conditioning fans, automotive fans, ventilation, vacuuming, small-scale propellers, etc.

In contrast to conventional techniques which rely on tweaking the blade curvature and chord length, the current invention is a radically different and simple approach.

According to an exemplary embodiment of the current invention, fluid-dynamic blade is provided comprising: a blade having a leading-edge and a trailing-edge; and an outsized Gurney flap connected to said trailing-edge of said blade, wherein size of said Gurney flap is at least 5 percent of the distance between said leading-edge and said trailing-edge of said blade.

In some embodiments size of said outsized Gurney flap is at least 10, 15 or 20 percent of the distance between said leading-edge and said trailing-edge of said blade.

In some embodiments the outsized Gurney flap is substantially at right angle to said blade.

In some embodiments the size of at least part of said outsized Gurney flap is larger than 10, 15 or 20 percent of the distance between said leading-edge and said trailing-edge of said blade.

In some embodiments the outsized Gurney flap is substantially at right angle to said blade.

In some embodiments the blade is thin. In some embodiments the blade is flat. In some embodiments the blade is curved.

In some embodiments the outsized Gurney flap is forward curved. In some embodiments the outsized Gurney flap is backward curved.

In some embodiments the blade has constant chord. In some embodiments the blade has variable chord.

In some embodiments the outsized Gurney flap has constant width. In some embodiments the outsized Gurney flap has variable width.

In some embodiments the outsized Gurney flap is serrated. In some embodiments the outsized Gurney flap has at least one indentation. In some embodiments the outsized Gurney flap has at least one opening.

In some embodiments the blade is operated such that at least part of the blade is at Reynolds number less than 100,000.

In some embodiments the blade is operated at Reynolds number less than 100,000.

According to another aspect of the current invention, a fan is provided comprising: a hub; at least one blade connected to rotating about said hub, said blade having: a leading-edge and a trailing-edge; and an outsized Gurney flap connected to said trailing-edge of said blade, wherein size of said Gurney flap is at least 5 percent of the distance between said leading-edge and said trailing-edge of said blade.

In some embodiments the size of said outsized Gurney flap is at least 10 percent of the distance between said leading-edge and said trailing-edge of said blade.

In some embodiments the fan further comprising a shroud around said at least one fan blade In some embodiments the fan is an axial fan.

In some embodiments the fan is a propeller.

In some embodiments the fan is a centrifugal fan.

According to another aspect of the current invention, a method of increasing lift coefficient of a fluid-dynamic blade is provided comprising attaching an outsized Gurney flap to trailing-edge of a blade, wherein size of said Gurney flap is at least 5 percent of the distance between leading-edge and said trailing-edge of said blade.

In some embodiments the method further comprising operating said blade at Reynolds number less than 100,000.

According to another aspect of the current invention, a method of increasing aerodynamic efficiency of a fluid-dynamic blade is provided comprising: attaching an outsized Gurney flap to trailing-edge of a blade, wherein size of said Gurney flap is at least 5 percent of the distance between leading-edge and said trailing-edge of said blade; and operating said blade at Reynolds number less than 100,000.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2c schematically depicts a cross section of forwards curved OGF according to an exemplary embodiment of the current invention.

DESCRIPTION OF THE PREFERRED EMBODIMENTS

Figure 1:
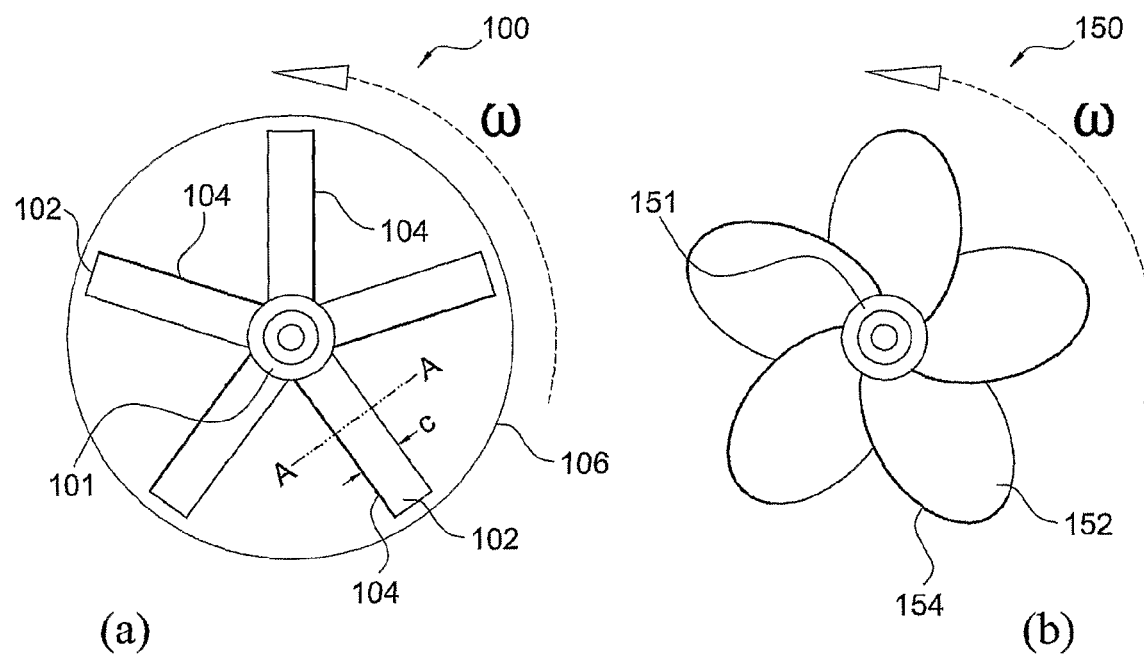
FIG. 1a schematically depicts an example of a constant chord fan according to an exemplary embodiment of the current invention.
FIG. 1b schematically depicts an example of a variable chord fan according to an exemplary embodiment of the current invention.

The present invention relates to enhancing performance of fans and propellers using outsized Gurney flaps.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In discussion of the various figures described herein below, like numbers refer to like parts.

The drawings may not be to scale. For clarity, non-essential elements were omitted from some of the drawings.

The present invention is described with respect to axial fans, but it is equally applicable to propellers, radial (centrifugal) fans and cross-flow fan (these latter two will be described in section 2.2 below). Consider the open axial fan schematics shown in FIGS. 1a and 1b.

FIG. 1a schematically depicts an example of a constant chord fan 100 according to an exemplary embodiment of the current invention.

Fan 100 comprises fan blades 102 having constant chord "c", rotating about hub 101. Optionally, a shroud 106 surrounds the fan.

Preferably, an Outsized Gurney Flap (OGF) 104 is attached to the trailing-edge of each fan blade 102. However, in some embodiments, only some of the blades are fitted with OGFs.

Figure 2:
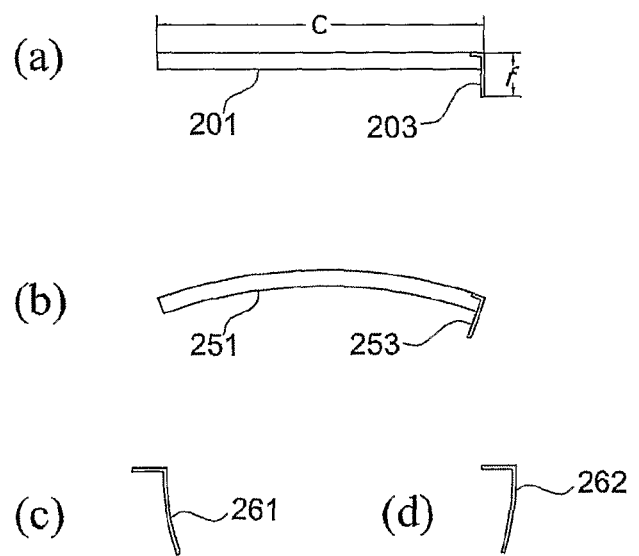
FIG. 2a schematically depicts a cross section of flat thin blade with trailing-edge OGF according to an exemplary embodiment of the current invention.
FIG. 2b schematically depicts a cross section of curved thin blade with trailing-edge OGF according to an exemplary embodiment of the current invention.
FIG. 2c schematically depicts a cross section of backwards curved OGF according to an exemplary embodiment of the current invention.
Figure 3:
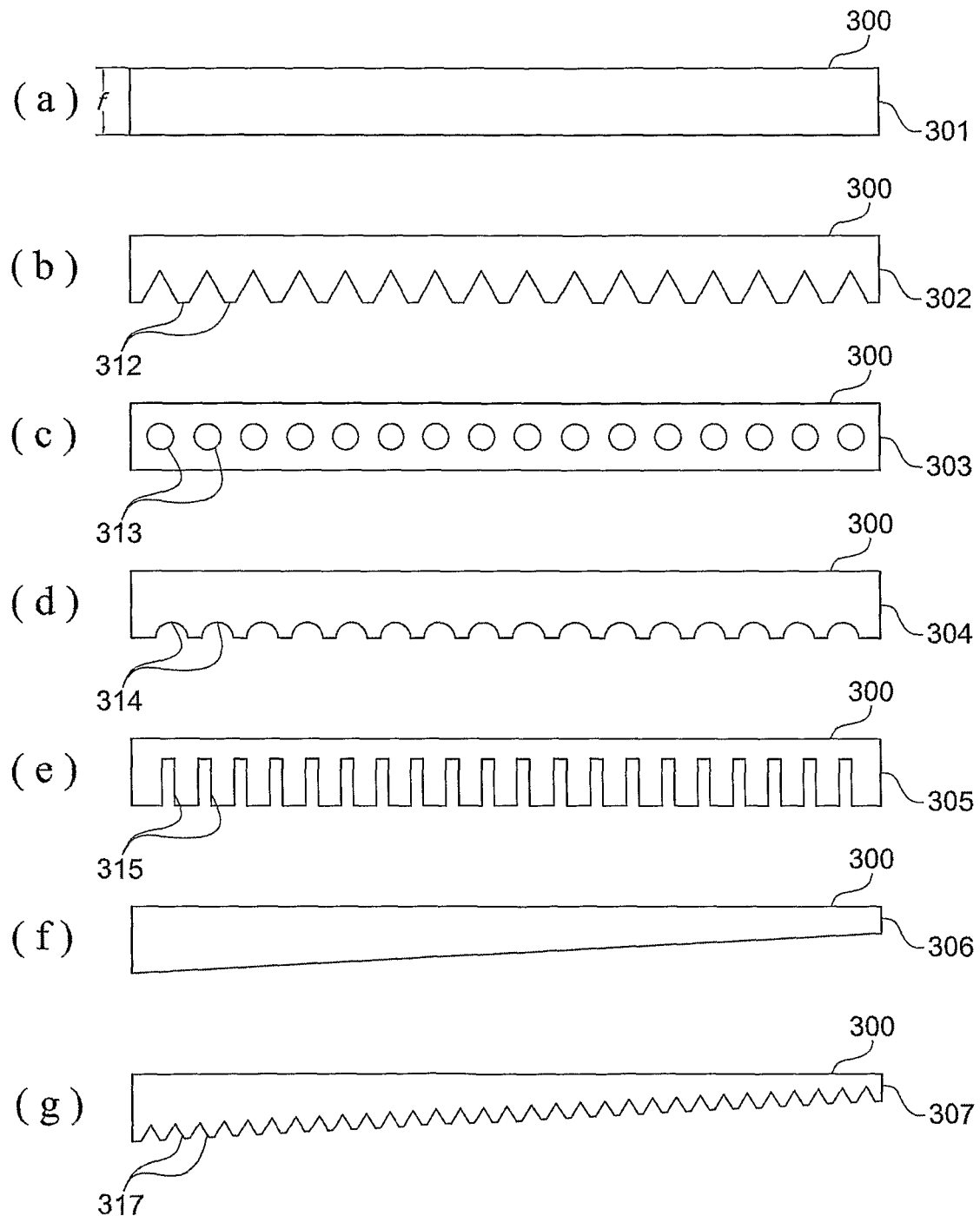
FIGS. 3a to 3g schematically depicts variations of the OGFs shapes according to exemplary embodiments of the current invention.

The line A-A depicts the location of a cross section seen in FIG. 2.

FIG. 1b schematically depicts an example of a variable chord fan 150 according to an exemplary embodiment of the current invention.

Fan 150 comprises fan blades 152 having variable chord "c", rotating about hub 151. Optionally, a shroud (not seen in this figure) surrounds the fan.

Preferably, an Outsized Gurney Flap (OGF) 154 is attached to the trailing-edge of each fan blade 152. However, in some embodiments, only some of the blades are fitted with OGFs.

The line A-A depicts the location of a cross section seen in FIG. 2.

It should be noted that according to the current embodiment fans 100 and 150 may be of propellers or ducted fans, and thus the schematics shown here are intended for purposes of description and illustration.

Is should also be noted that the number of blades is not limited to four blades as seen in FIG. 1. According to the current invention there can be anything from one to several tens or hundreds of blades.

The fan is driven by a motor (not shown) that causes it to rotate (in the illustrating figure) in a counter-clockwise direction.

FIG. 2a schematically depicts a cross section of flat thin blade 201 with trailing-edge OGF 203 according to an exemplary embodiment of the current invention.

FIG. 2b schematically depicts a cross section of curved thin blade 251 with trailing-edge OGF 253 according to an exemplary embodiment of the current invention.

Cross sections seen in FIGS. 2a and 2b are along the A-A lines in FIGS. 1a and 1b.

The size "f" of the OGF is at lest 10% of the chord size "c" at least in some substantial length of the blade. The size of the OGF and the ratio f/c may vary along the length of the fan blade. Specifically, in a variable chord blade such as seen in FIG. 1b, OGF size may vary. Additionally, since air speed is changing along the length of the fan blade, the size of the OGF and the ratio f/c may vary along the length of the fan blade. In some embodiments OGF may not extend the full length of the blade.

Figure 4:
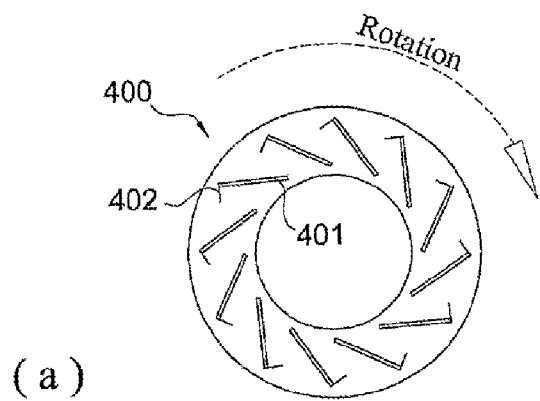
FIG. 4a schematically depicts a centrifugal fan having backward inclined blades having OGFs according to an exemplary embodiment of the current invention.
FIG. 4b schematically depicts a centrifugal fan having airfoil blades having OGFs according to an exemplary embodiment of the current invention.
FIG. 4c schematically depicts a centrifugal fan having forward curved blades having OGFs according to an exemplary embodiment of the current invention.
Figure 4:
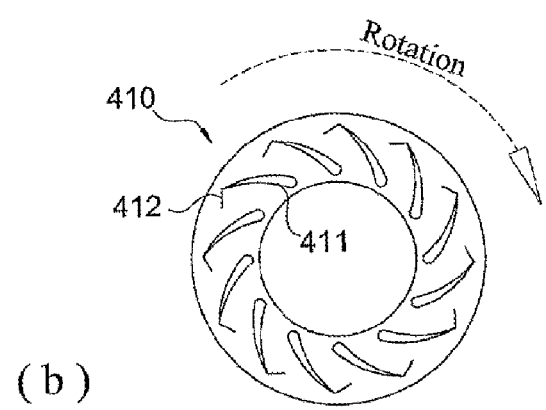
Figure 4:
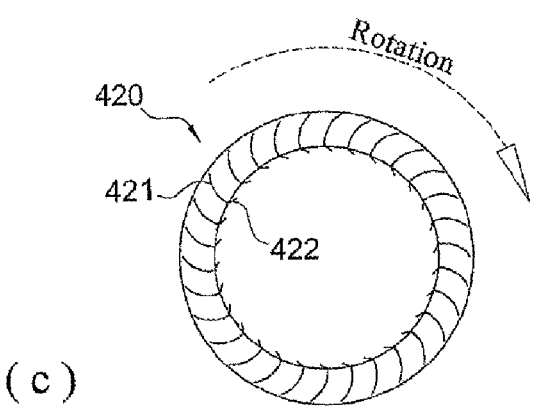

In some embodiments, the OGF is attached to the blades. Alternatively, OGF may be made as part of the blade structure, for example, blade and OGF may be molded, pressed, machined or extruded as one part. Optionally, the joint between the blade and OGF may be rounded. Thin blade profiles are seen in FIGS. 2a and 2b as example, profiled blades may be used such as seen in FIG. 4b.

The OGF itself may be straight as seen in FIGS. 2a and 2b, backward curved OGF 261 as seen in FIG. 2c or having forward curvature as forward curved OGF 262 seen in FIG. 2c. Is should be noted that the OGFs seen in these figures are depicted as having right angle to the blade, however OGF may be at different angles to the blade.

Preferably, the blades have a rounded leading-edge. Preferably the blades are oriented with an attack angle with respect to the relative air velocity.

In the examples of FIGS. 2a and 2b, the flaps extend downwards by more than 10% of the blade chord c. This would generally be considered counterintuitive to one skilled in the art but at low Reynolds numbers, typically less than 100,000, these OGFs produce both large increases in effectiveness and efficiency.

FIGS. 3a to 3g schematically depicts variations of the OGFs shapes according to exemplary embodiments of the current invention.

OGFs 301 to 307 seen in FIGS. 3a to 3g respectively are attached to the blade along joint 300.

For example: FIG. 3a depicts a constant width OGF 301 having width "f"; FIG. 3b depicts a serrated OGF 302 having substantially equal teeth 312; FIG. 3c depicts a constant width OGF 303 having open windows 313; FIG. 3d depicts a constant width OGF 304 having equal shaped indentations 314; FIG. 3e depicts a constant width OGF 305 having equal shaped slots 315; FIG. 3f depicts a variable width OGF 306; and FIG. 3g depicts a variable width OGF 307 having triangular indentations 317;

In some embodiments, the OGFs have three dimensional shapes.

Clearly, the depicted examples are only illustrative and many variations are conceivable including decorative shapes. The reason for introducing three-dimensionality is to break down the vortex shedding that occurs on bluff bodies such as these.

OGFs may also be applied to centrifugal fans (sometimes called radial blowers) and crossflow fans. Consider the impellers of two typical centrifugal fans, i.e. with backward inclined 400 and airfoil 410 type vanes shown in FIGS. 4a and 4b, respectively, and the impeller of a crossflow fan, with forward curved vanes 420, shown on FIG. 4c according to exemplary embodiments of the current invention.

The backward inclined blade profiles 401 correspond to blade example shown in FIG. 2a. The forward inclined blade profiles 421 correspond to blade example shown in FIG. 2b. FIG. 4b depicts airfoil profiled blades 411.

In a conventional centrifugal fan no OGFs are present. In this invention, OGFs 402, 412 422 are applied at the trailing edges of the blades 401, 411, 421.

The above examples referred to airflows. However, similar applications of the present invention can be found in the context of liquids. One example is on ship propellers where the Gurney flaps are applied to the propeller in the manner described with respect to FIGS. 1b, 2 and 3. A second example is for liquid pump applications, for pumping liquids such as water or fuel, where the Gurney flaps is applied to impeller blades such as those shown in FIG. 4.

Figure 5:
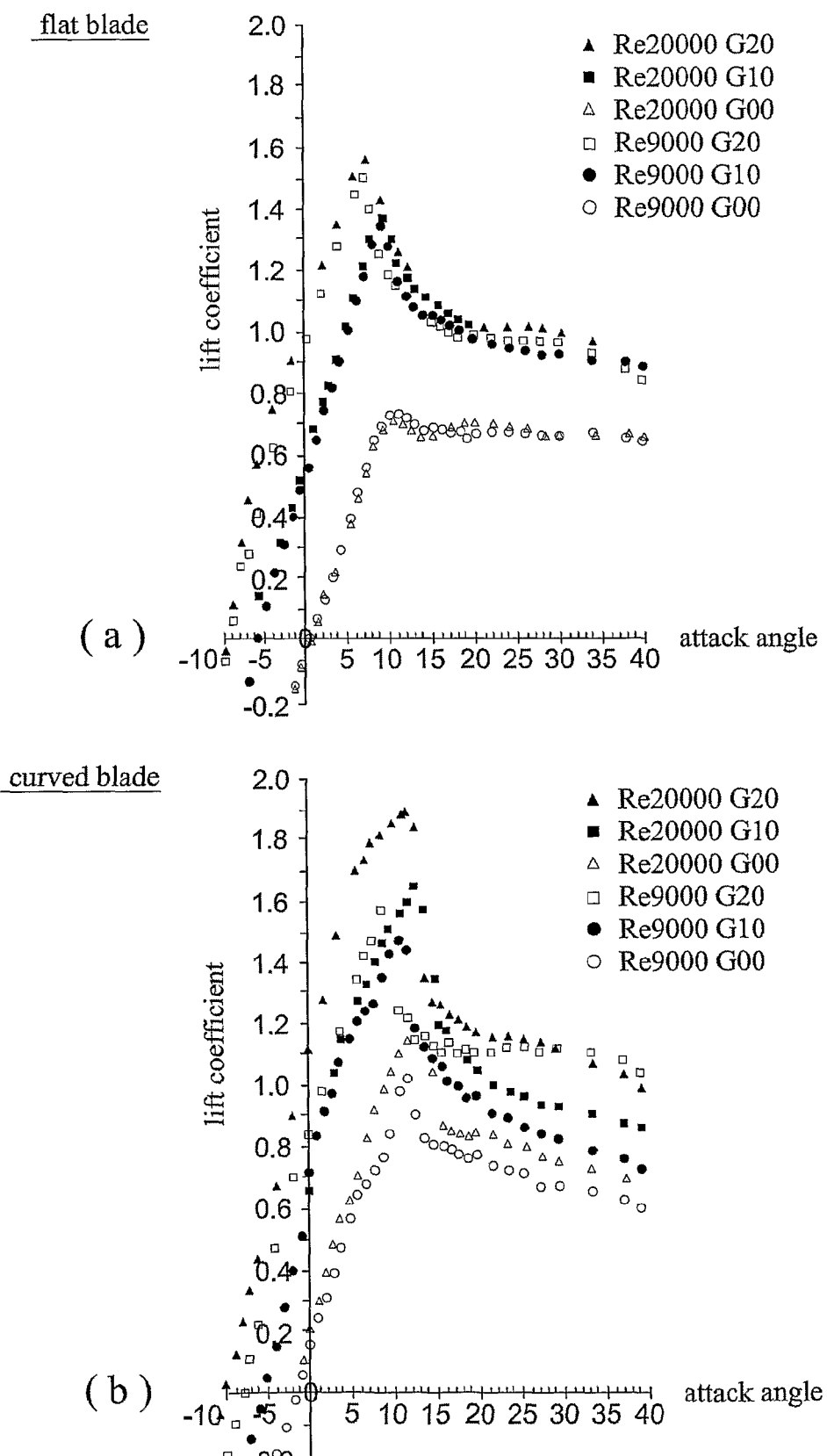
FIGS. 5a and 5b schematically depicts an experimental results showing lift coefficient vs. attack angle for flat thin blade and curved thin blade respectively.
Figure 6:
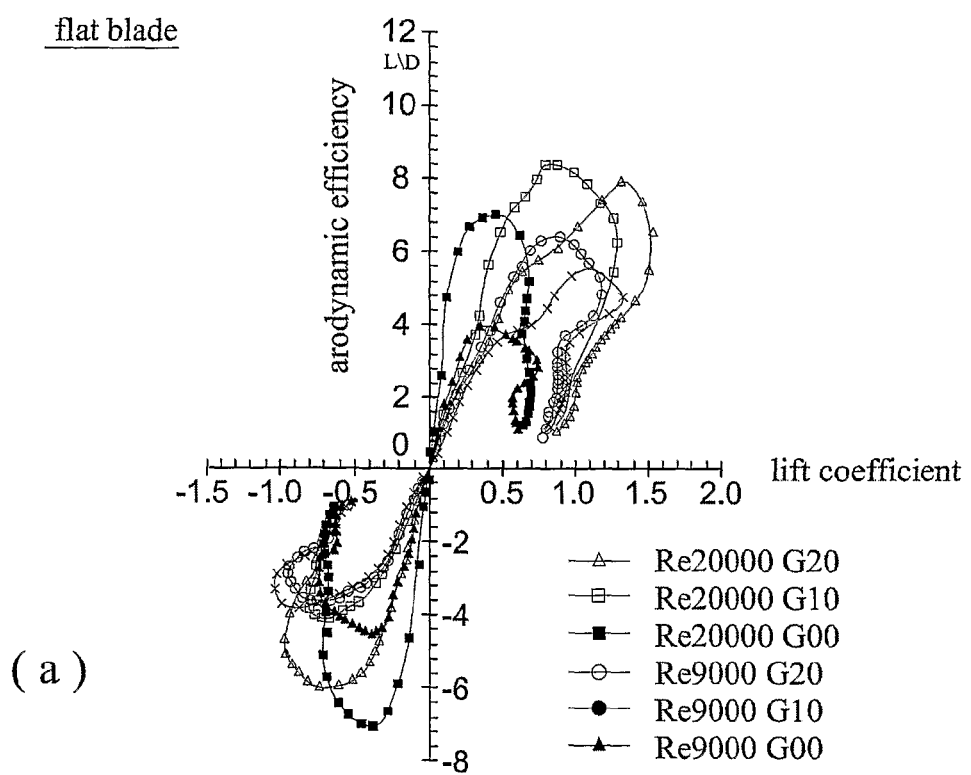
FIGS. 6a and 6b schematically depicts an experimental results showing aerodynamic efficiency vs. lift coefficient for flat thin blade and curved thin blade respectively.
Figure 6:
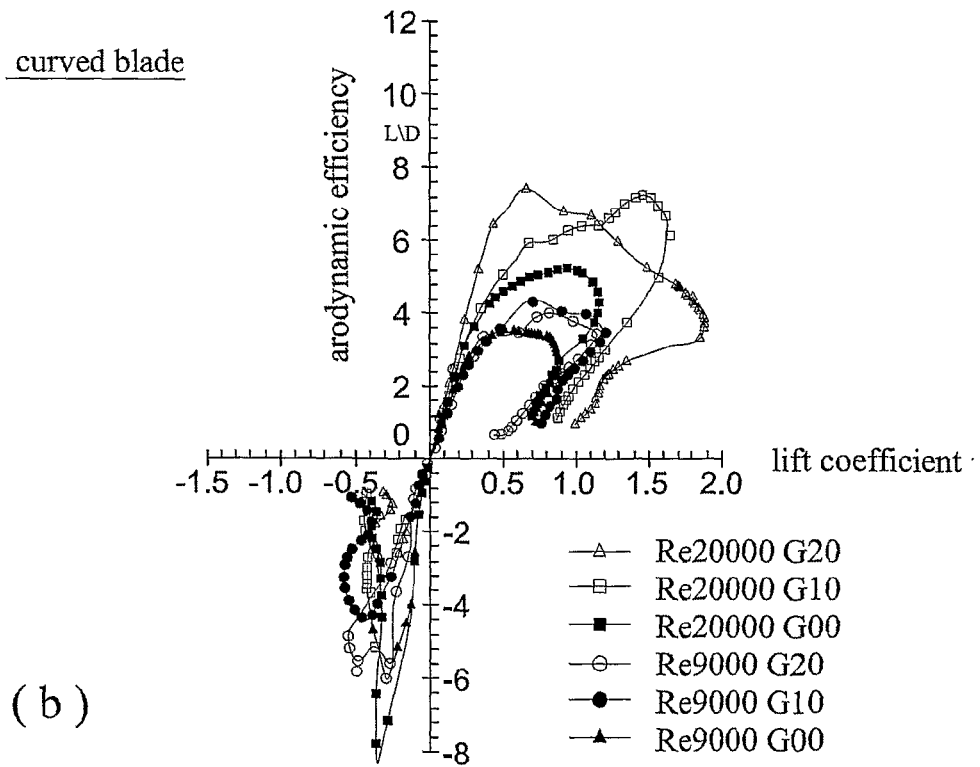

FIGS. 5 and 6 presents some experimental results showing advantages of OGFs constructed according to exemplary embodiments of the current invention.

FIGS. 5a and 5b schematically depicts an experimental results showing lift coefficient vs. attack angle for flat thin blade and curved thin blade respectively.

Increased lift coefficient is evident at Reynolds number of 9,000 and 20,000 when OGFs of 10% or 20% size (compare to chord size) were installed on the flat or the curved blades.

FIGS. 6a and 6b schematically depicts an experimental results showing aerodynamic efficiency vs. lift coefficient for flat thin blade and curved thin blade respectively.

Increased aerodynamic efficiency is evident at Reynolds number of 3,000 and 20,000 when OGFs of 10% or 20% size (compare to chord size) were installed on the flat or the curved blades.

Experiments were performed on straight and curved blade profiles at low Reynolds numbers, less than about 100,000, such as those found on large classes of fans, for example.

Outsized Gurney flaps were used, namely 10% and 20% of the profile chord. Lift coefficient versus angle of attack data are show in FIGS. 5a and 5b for flat and curved profiles respectively. In the figures, the number opposite "Re" is the Reynolds number and the number opposite "G" is the OGF length as a percentage of chord length.

It can clearly be seen that that the OGFs dramatically increase the lift on the blade profiles. This is true whether or not the blade is curved. On a fan this translates to a far greater CFM for a given RPM for a specified fan size.

The intuition of anyone skilled in the conventional art of aerodynamics would be that the drag would increase dramatically and therefore render the OGFs inefficient. However, data acquired by the inventor indicates that this is not the case, and this is shown in FIG. 6. In fact, for both 10% and 20% OGFs on both flat and curved profiles, the aerodynamic efficiency (shown on the vertical axis) shows substantial improvements for a give lift coefficient (shown on the horizontal axis).

This in not only non-obvious, it is counterintuitive and requires further study to understand why this is happening. It is further pointed out that the OGFs used to generate the data shown in FIGS. 5 and 6 corresponded to the design shown in FIG. 3a, namely a constant size OGF. By employing the designs shown FIGS. 3b to 3g or similar variations, efficiency can be further increased without adversely affecting lift generation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A fluid-dynamic blade comprising:
   a blade having a leading-edge and a trailing-edge; and
   an outsized Gurney flap connected to said trailing-edge of said blade, wherein size of at least a substantial part of said Gurney flap is at least 15 percent of the distance between said leading-edge and said trailing-edge of said blade,
   wherein said outsized Gurney flap is substantially at right angle to said blade, and
   wherein at least a substantial part of said blade is operated at Reynolds number less than 100,000, wherein said outsized Gurney flap is serrated.

2. A fan comprising:
   a hub;
   a plurality of blades connected to be rotating about said hub, each of said plurality of blades is having:
   a leading-edge and a trailing-edge; and
   an outsized Gurney flap connected to said trailing-edge of said blades, wherein size of at least a substantial part of said Gurney flap is at least 15 percent of the distance between said leading-edge and said trailing-edge of the blade, wherein said outsized Gurney flap is substantially at right angle to said blade, and wherein at least a substantial part of said blade is operated at Reynolds number less than 100,000, further comprising a shroud around said plurality of said blades.

3. A fan comprising:

a hub;

a plurality of blades connected to be rotating about said hub, each of said plurality of blades is having:

a leading-edge and a trailing-edge; and an outsized Gurney flap connected to said trailing-edge of said blades, wherein size of at least a substantial part of said Gurney flap is at least 15 percent of the distance between said leading-edge and said trailing-edge of the blade, wherein said outsized Gurney flap is substantially at right angle to said blade and wherein at least a substantial part of said blade is operated at Reynolds number less than 100,000, wherein said outsized Gurney flap is serrated.

4. A fan comprising:

a hub;

a plurality of blades connected to be rotating about said hub, each of said plurality of blades is having:

a leading-edge and a trailing-edge; and an outsized Gurney flap connected to said trailing-edge of said blades, wherein size of at least a substantial part of said Gurney flap is at least 15 percent of the distance between said leading-edge and said trailing-edge of the blade, wherein said outsized Gurney flap is substantially at right angle to said blade, and wherein at least a substantial part of said blade is operated at Reynolds number less than 100,000, wherein the fan is a centrifugal fan.

* * * * *